March 17, 1931.  B. E. TYLER  1,796,415
PISTON PACKING
Filed June 10, 1929
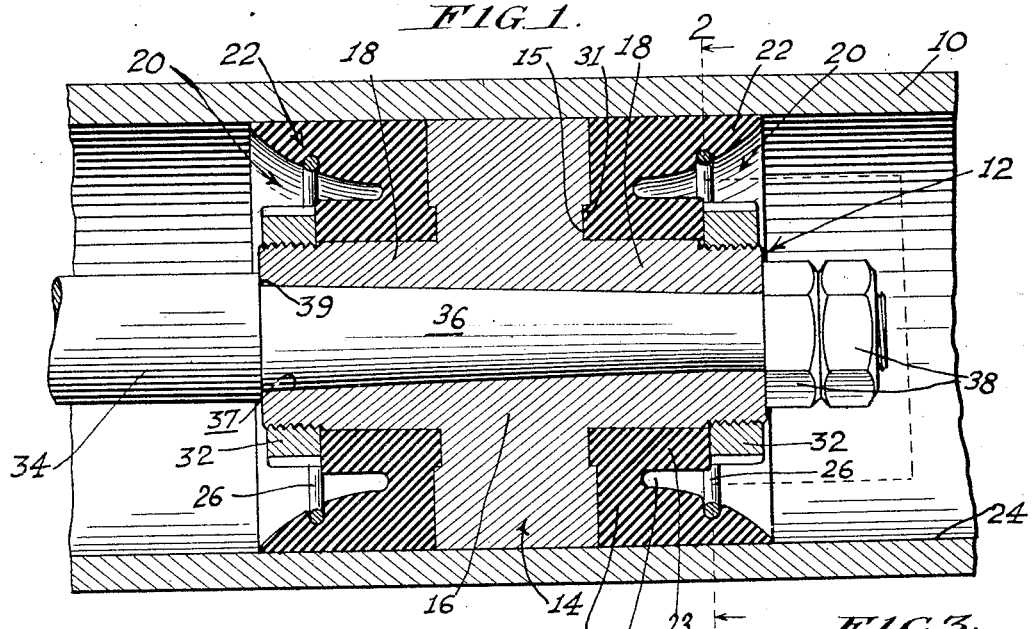
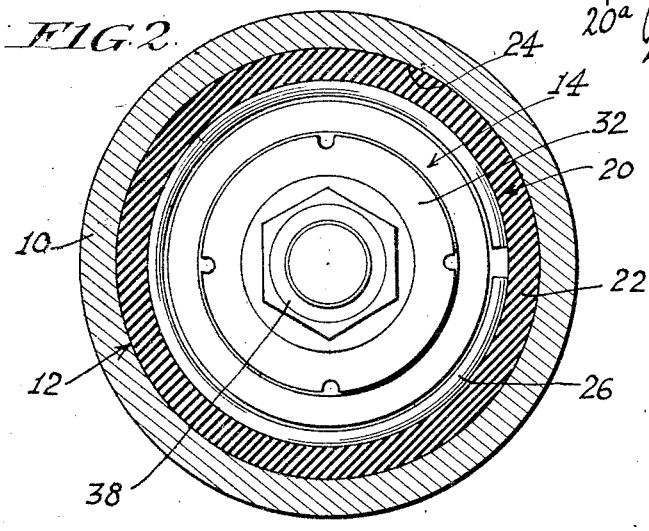
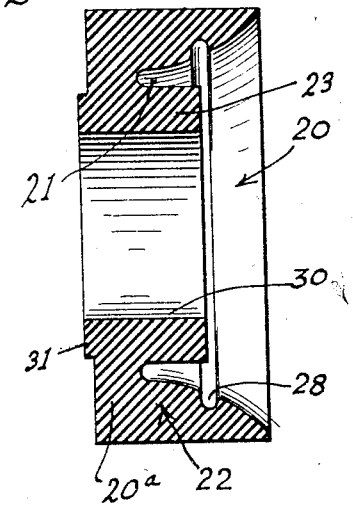
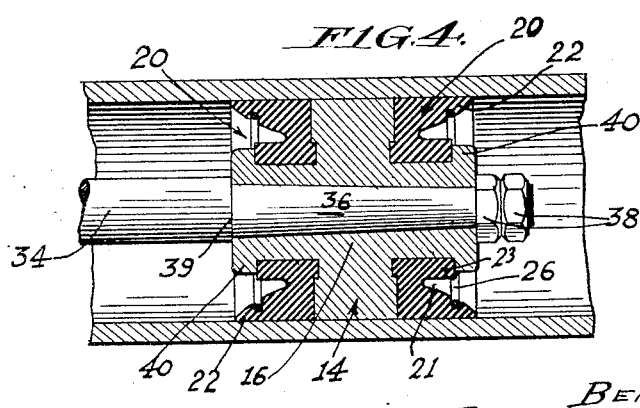
INVENTOR.
BERT E. TYLER
ATTORNEY.

Patented Mar. 17, 1931

1,796,415

UNITED STATES PATENT OFFICE

BERT E. TYLER, OF LOS ANGELES, CALIFORNIA

PISTON PACKING

Application filed June 10, 1929. Serial No. 369,590.

This invention relates to pump pistons, and more particularly to packing for pistons used in slush or mud pumps.

The object of this invention is to provide a piston having packing expansible by fluid pressure developed within the cylinders during operation of the pump and automatically kept in contact with the pump liner as the packing wears by self-expanding rings carried by the packing.

An embodiment of the invention is illustrated in the accompanying drawings, in which:

Fig. 1 is a sectional view of the pump liner and piston.

Fig. 2 is a transverse sectional view taken on line 2—2 of Fig. 1 in the direction indicated by the arrows.

Fig. 3 is a detail sectional view of the packing.

Fig. 4 is a sectional view similar to Fig. 1 showing the modified form.

Referring to the drawings, 10 designates a pump liner in which is disposed a piston 12.

The piston consists of a body 14 formed of cast metal having a central portion 16 from which extend oppositely disposed hubs 18 adapted to receive packing rings 20 formed of rubber.

Each packing ring has an annular flange 22 tapered in cross section which engages the liner wall 24 and is held in contact therewith by a split expansion ring 26 formed of spring metal resting in a groove 28 formed in the flange 22, and is adapted to radially expand the flange 22 into contact with the liner wall as the packing ring wears.

The packing rings have a central opening 30 which engages the hubs 18 and are held in place thereon by nuts 32 threaded on the outer ends of the hubs.

An annular boss 31 is formed on the inner face of the packing ring and fits within a corresponding recess 15 formed in the central portion of the body in order to prevent deformation or lateral displacement of the inner portion 20ª of the packing rings due to excessive hydraulic pressure.

It will be noted that an annular groove 21 is formed in the packing rings between the flange 22 and the sleeve 23 which engages the hubs 18.

A piston rod 34 has a reduced diameter portion designated at 36 which extends through a bore 37 in the body 14 and is threaded at its outer end to receive nuts 38 which, together with a shoulder 39, secure the piston to the rod.

During operation of the pump the fluid pressure developed within the cylinder will act upon the internal area of the flanges 22 and sleeve 23 and expand same into contact with the liner wall and hub 18. Thus it will be seen that fluid in the annular groove 21 will uniformly expand the flanges 22 and sleeves 23 and also force the inner portion 20ª alternating against the faces of the central portion 16 during the power stroke, thereby preventing any grit entering between the sleeves 23 and hubs 18, or between the annular flange 22 and liner wall 24.

As the packing wears the expansion rings will automatically retain the flanges in expanded position, thereby preventing any grit or mud getting between the packing rings and liner wall during the suction stroke.

The construction illustrated in Fig. 4 is substantially the same as illustrated in the preceding figures, with the exception that the nuts 32 and threading on the end of the hubs 18 are replaced with annular flanges 40. The packing elements 22 are exactly similar as in the first form, the central openings in each element being of slightly less diameter than the external diameter of the hubs in order that the packing rings will firmly grip the same when the same are positioned thereon, a suitable expanding tool (not shown) being employed to force the packing rings over the flanges 40 and onto the seat hubs.

I claim:

1. A piston comprising a cylindrical body member, hubs projecting from each end of the body member, packing rings mounted on said hubs, nuts threaded on said hubs to retain said packing rings on the body member, and metal expansion rings internally engaging said packing rings.

2. A piston comprising a body having a central portion and oppositely disposed hubs projecting therefrom, packing rings having annular flanges mounted on said hubs, and split rings of spring metal internally engaging the flanges of said packing rings.

3. A piston comprising a cylindrical body member, hubs having annular flanges on their outer ends projecting from each end of said body member, packing rings having openings therein adapted to be forced over the annular flanges of said hubs and into engagement with the hubs, and split rings of spring metal internally engaging the flanges of said packing rings.

In testimony whereof I affix my signature.

BERT E. TYLER.